United States Patent [19]

Mori

[11] Patent Number: 5,159,454
[45] Date of Patent: Oct. 27, 1992

[54] HORIZONTAL-SYNCHRONIZING-PULSE MEASURING CIRCUIT

[75] Inventor: Hisasi Mori, Tokyo, Japan
[73] Assignee: NEC Corporation, Tokyo, Japan
[21] Appl. No.: 604,959
[22] Filed: Oct. 29, 1990

[30] Foreign Application Priority Data

Oct. 27, 1989 [JP] Japan .................. 1-281066

[51] Int. Cl.$^5$ ............................................. H04N 5/04
[52] U.S. Cl. .................................... 358/148; 358/139
[58] Field of Search ............... 358/148, 153, 139, 150, 358/154, 320, 323, 337

[56] References Cited

U.S. PATENT DOCUMENTS 4,722,004 1/1988 Miyamoto et al. ................ 358/139
4,843,470 6/1989 Wook et al. ........................ 358/153

FOREIGN PATENT DOCUMENTS

61-5279 11/1986 Japan .

Primary Examiner—Victor R. Kostak
Attorney, Agent, or Firm—Whitham & Marhoefer

[57] ABSTRACT

A horizontal-synchronizing-pulse measuring circuit which is reset by a vertical synchronizing pulse to measure the number of a plurality of horizontal synchronizing pulses includes a reference-signal generating circuit for generating a reference signal, an enabling-signal generating circuit for generating an enabling signal, and a vertical-position detecting circuit. The vertical-position detecting circuit allows outputting of the reference signal when the enabling signal is active and outputting of a holding signal when the enabling signal is non-active. The measuring circuit further comprises two flip-flops, the first flip-flop receiving an output from the vertical-position detecting circuit and a clock input of the vertical synchronizing pulse and the second flip-flop receiving the output from the first flip-flop and a clock input of the vertical synchronizing pulse. Switching between the output from the first flip-flop and that from the second flip-flop is effected by a changeover switch to output a signal as the holding signal. The measuring circuit according to the invention is particularly suited for use in a character generator for a VTR in which, due to the changeover switch, the necessary selection of the fields concerned can be effected thereby providing a screen which has no vertical vibration and which is easy to see.

5 Claims, 12 Drawing Sheets

HORIZONTAL-SYNCHRONIZING-PULSE MEASURING CIRCUIT

BACKGROUND OF THE INVENTION

The present invention relates to a horizontal-synchronizing-pulse measuring circuit for measuring the number of horizontal synchronizing pulses.

There has conventionally been known that, for example, in an IC (integrated circuit) such as for a CRT (cathoderay tube) character generator which displays a character or the like at a desired position on a CRT, the vertical position of such character on the CRT is set by the measurment of the number of horizontal synchronizing pulses after the occurrence of a vertical synchronizing pulse. The detailed explanation of the structure and operation of such a conventional horizontal-synchronizing-pulse measuring circuit will be given later before the preferred embodiments of the present invention are explained.

For a horizontal-synchronizing-pulse measuring circuit to be used, for example, in a character generator for a VTR, it is desired for the circuit to prevent any vertical vibration from occurring on a screen of a CRT. The present invention provides a measuring circuit which meets such a desire.

SUMMARY OF THE INVENTION

It is an object of the invention to provide a horizontal-synchronizing-pulse measuring circuit which is free of vertical vibration on a screen and whose screen is easy to see.

According to the invention, there is provided a horizontal-synchronizing-pulse measuring circuit which is reset by a vertical synchronizing pulse to measure the number of a plurality of horizontal synchronizing pulses, the horizontal-synchronizing-pulse measuring circuit comprising:

a horizontal address counter;

a dummy-pulse generating circuit for generating a dummy pulse, a reference-signal generating circuit for generating a reference signal, an enabling signal generating circuit for generating an enabling signal, each of which being connected to the horizontal address counter;

a vertical-position detecting circuit for outputting the reference signal when the enabling signal is active and a holding signal when the enabling signal is nonactive;

a horizontal/dummy switching circuit for effecting switching such that the dummy pulse is outputted only once following the vertical synchronizing pulse at the time when an output from the vertical-position detecting circuit is non-active and the horizontal synchronizing pulses are outputted at other times;

a first-flip flop receiving a signal input from the vertical-position detecting circuit and a clock input of the vertical synchronizing pulse;

a second flip-flop receiving a signal input from the first flip-flop and a clock input of the vertical synchronizing pulse;

a changeover switch which effects switching between the output from the first flip-flop and an output from the second flip-flop to output a signal as the holding signal; and a measuring circuit for measuring output pulses from the horizontal/dummy switching circuit.

The horizontal-synchronizing-pulse measuring circuit of the invention is particularly suited for use in a character generator for a VTR and is one in which, irrespective of whatever relation the vertical synchronizing pulse of a reproducing signal may have with respect to the first field and the second field, the state same as the last state or the state same as that of the field before last can be selected by the changeover switch thereby producing a screen which has no vertical vibration and which is easy to see.

BRIEF DESCRIPTION OF THE DRAWINGS

The above and other objects, features and advantages of the present invention will be apparent from the following description of preferred embodiments according to the invention explained with reference to the accompanying drawings, in which.

PREFERRED EMBODIMENTS OF THE INVENTION

Throughout the following explanation, similar reference symbols or numerals refer to the same or similar elements in all figures of the drawings.

Firstly, for the purpose of assisting in the understanding of the present invention, a conventional horizontal-synchronizing-pulse measuring circuit and problems existing therein will be explained by making reference to FIG. 7, FIG. 8, FIGS. 9(a) and 9(b), FIG. 10, and FIGS. 11(a), 11(b) and 11(c).

Figure 7:
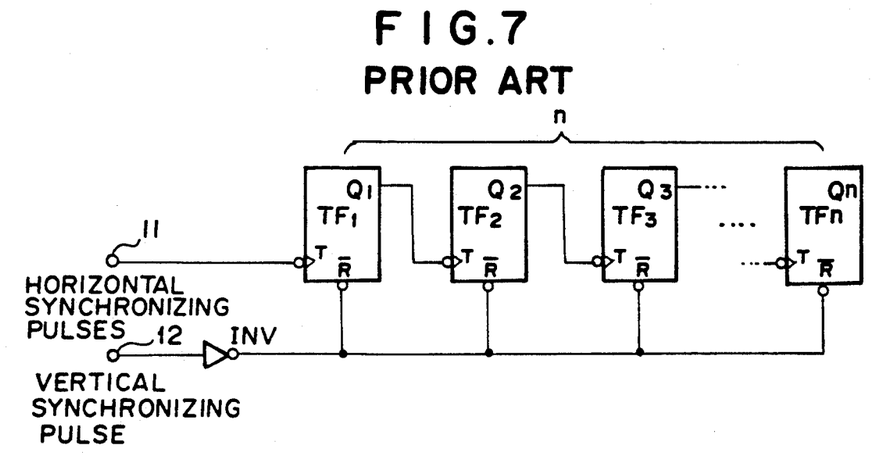
FIG. 7 is a block diagram showing a prior art horizontal-synchronizing-pulse measuring circuit.
Figure 8:
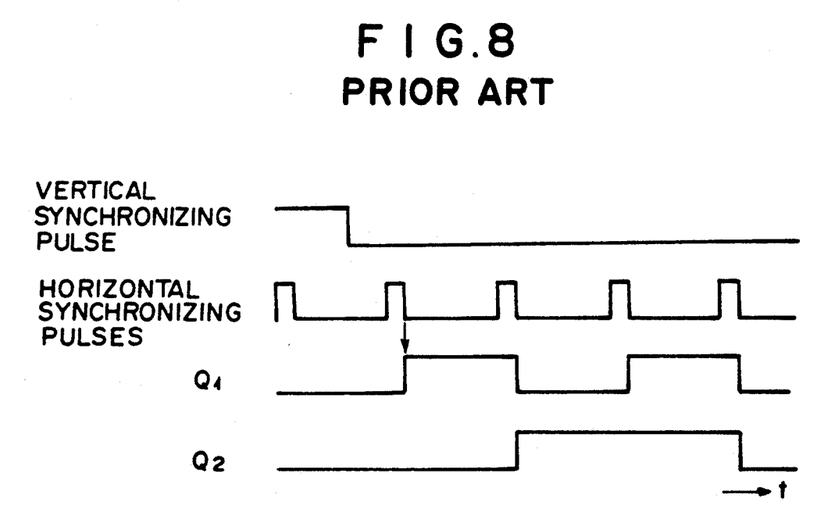
FIG. 8 is a timing chart for explanation of operation of the measuring circuit illustrated in FIG. 7.

FIG. 7 of the attached drawings shows a circuit diagram of the above-described conventional measuring circuit. A plurality (n number) of T-flip-flops $TF_1 \ldots TF_n$ are connected in series to each other. The horizontal synchronizing pulses are inputted to an input terminal 11 which is connected to a clock terminal T of the first stage T-flip-flop $TF_1$. The T-flip-flops have their respective reset terminals R which are connected in common to an output of an inverter INV. The vertical synchronizing pulses are inputted to an input terminal 12 which is connected to an input of the inverter INV.

The T-flip-flops $TF_1$, $TF_2$, ..., $TF_n$ have their respective non-inverting outputs $Q_1$, $Q_2$, ..., $Q_n$ which are inputted respectively to the clock terminals T at the stages to follow. As depicted in a time chart illustrated in FIG. 8, the respective non-inverting outputs $Q_1$, $Q_2$, .... $Q_n$ indicate the number of the horizontal synchronizing pulses inputted to the terminal 11 after the fall of the vertical synchronizing pulse inputted to the terminal 12.

In the case of a weak electric field in which the above-described conventional example is applied to a TV receiver, the following phenomena occurs. That is, as shown in FIGS. 9(a) and 9(b), if a horizontal synchronizing pulse is taken as a standard, the fall position of the vertical synchronizing pulse vibrates back and forth of the horizontal synchronizing pulse.

Figure 9A:
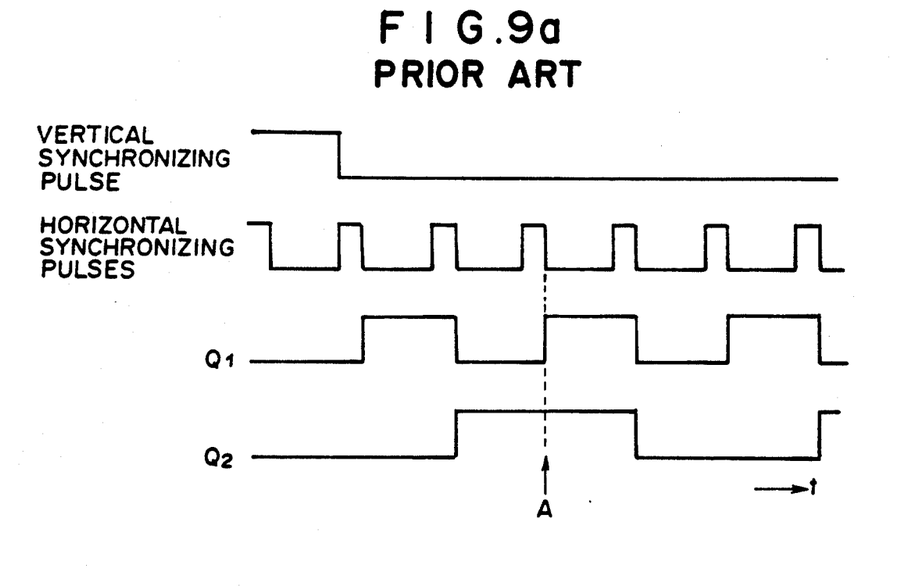
FIGS. 9(a) and 9(b) are timing charts for an explanation of the operation of the measuring circuit illustrated in FIG. 7.
Figure 9B:
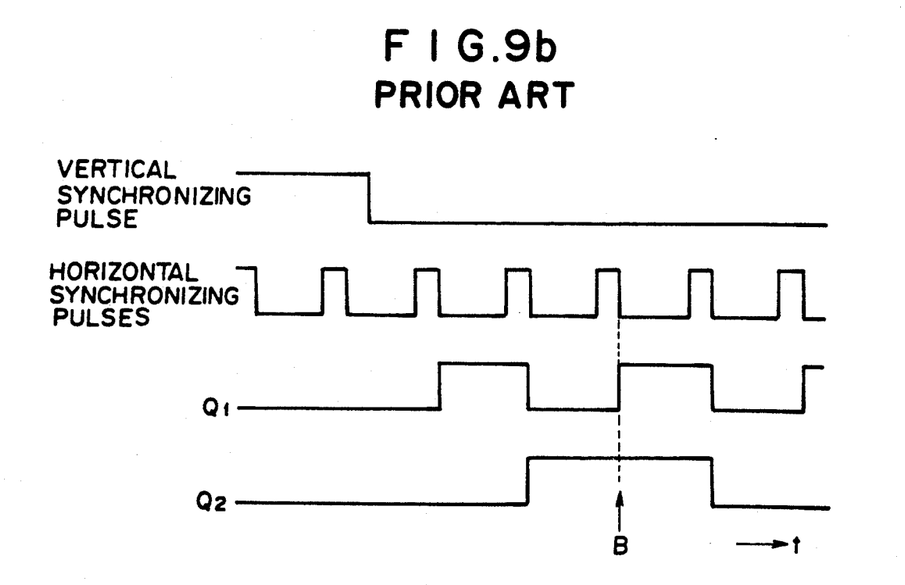

For example, when seen from FIGS. 9(a) and 9(b), the position of the measured number three (3) of the horizontal synchronizing pulses is brought to a point A and a point B. Between the points A and B, there is a deviation of a single horizontal synchronizing pulse. Thus, an output from a horizontal-synchronizing-pulse measuring circuit is deviated by one (1) clock (1H) caused by the minute vibration of the vertical synchronizing pulse. This phenomenon is displayed by vibration of a location where the display character on the CRT is deviated only by 1H. Accordingly, the above-described phenomenon presents difficulties for observing the displayed character.

Figure 10:
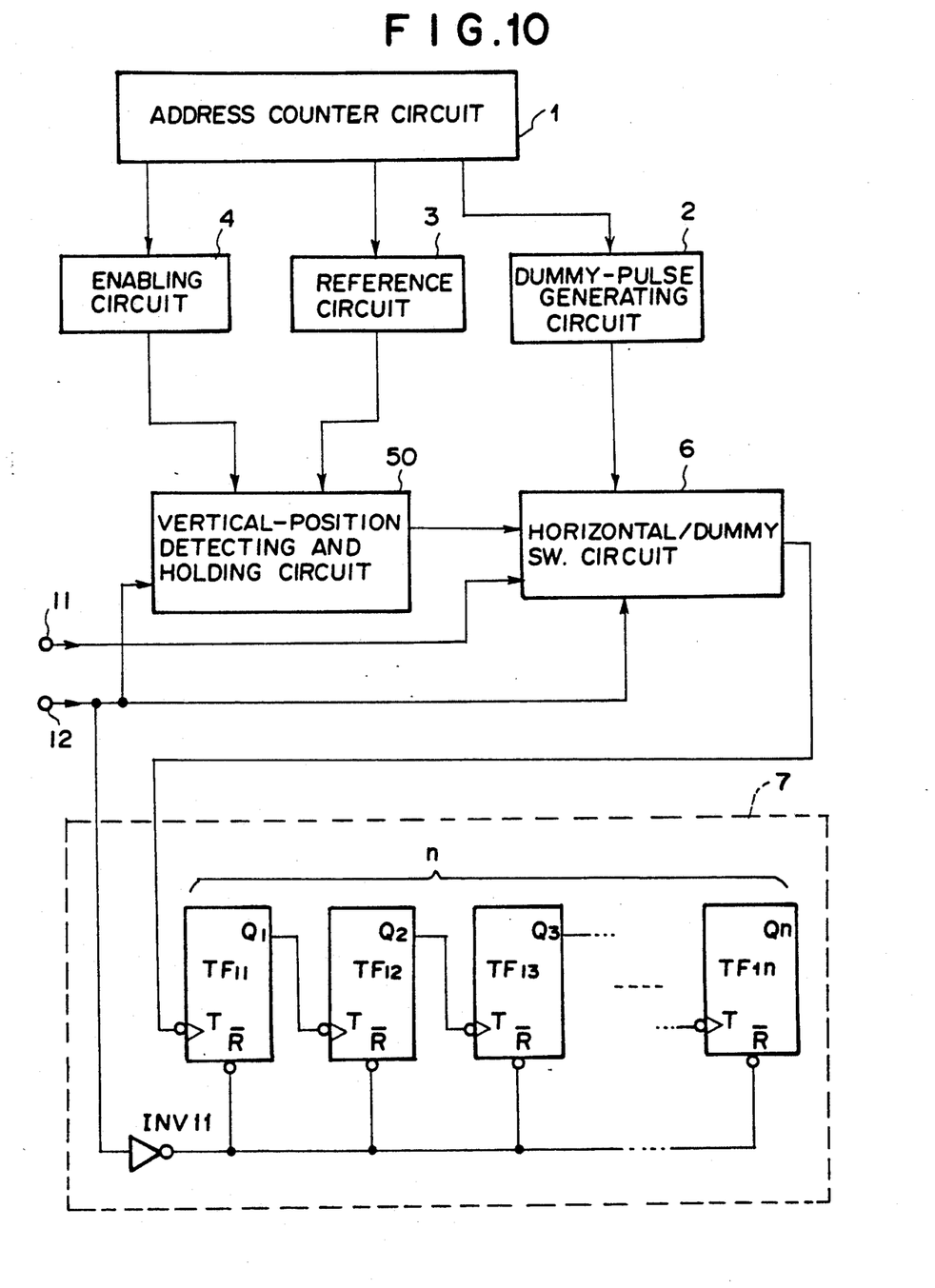
FIG. 10 is a block diagram showing a prior art circuit which includes a certain improvement.

There is a circuit disclosed in Japanese Patent Application Kokai Publication No. SHO 61-5279, as a circuit which compensates for the deviation by one pulse (1H) noted in the measured number of the horizontal synchronizing pulses caused by minute vibration of the above-described vertical synchronizing pulse. The circuit is shown in FIG. 10 of the attached drawings.

The above circuit comprises an address counter circuit 1, a dummy-pulse generating circuit 2, a reference-signal generating circuit 3, and enabling-signal generating circuit 4, a vertical-position detection and holding circuit 50, and a horizontal/dummy switching circuit 6. Connected to outputs from the address counter circuit 1, which divides an interval between the horizontal synchronizing pulses into, for example, twenty-four (24), are three circuit blocks, that is, the dummy-pulse generating circuit 2 which outputs a dummy pulse at the fifth address, the reference-signal generating circuit 3 which outputs an "H" active signal at the fourth address and above, and the enabling-signal generating circuit 4 which outputs an "L" active signal at the zero address and the fifth address. Further, inputted to the vertical-position detection and holding circuit 50 are an output from the reference circuit 3, and output from the enabling circuit 4 and the vertical synchronizing pulses applied to the input terminal 12. When the enabling signal is active, the reference signal is latched at the timing of the fall of the vertical synchronizing pulse. On the other hand, when the enabling signal is non-active, the previous state is held. By doing so, it is judged whether or not the vibration range of the fall position of the vertical synchronizing pulse is within the three addresses including the horizontal synchronizing pulse. The output of the vertical-position detection and holding circuit 50, the horizontal synchronizing pulses, the dummy pulses and the vertical synchronizing pulses are inputted to the horizontal/dummy switching circuit 6.

The output of the horizontal/dummy switching circuit 6 serves as clocks for a measuring circuit 7.

Figure 11A:
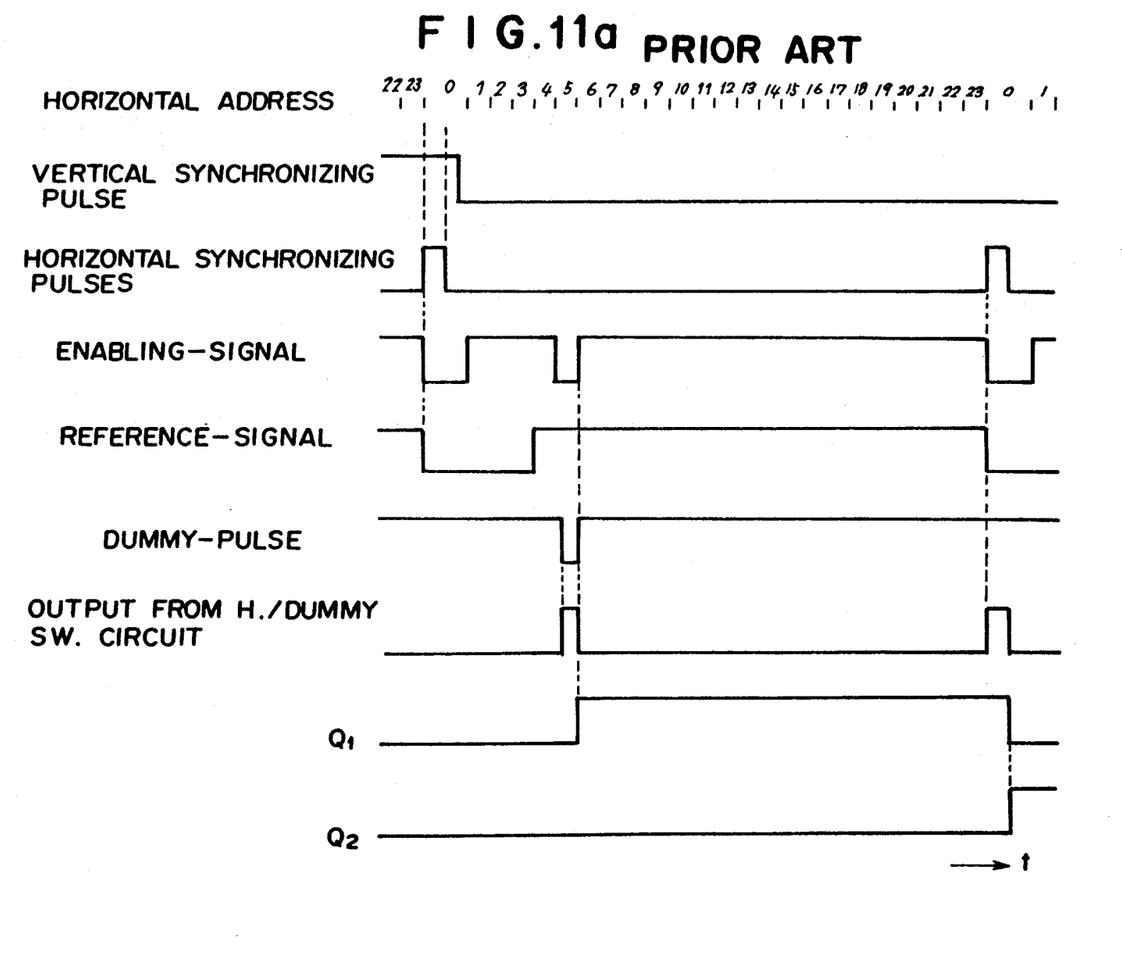
FIGS. 11(a) and 11(b) are timing charts for an explanation of the operation of the circuit illustrated in FIG. 10.

In the case where the above circuit is used in a TV receiver at a weak electric field, the following phenomenon occurs. That is, as shown in timing charts illustrated respectively in FIGS. 11(a) and 11(b), if the horizontal synchronizing pulse is taken as a reference, the fall position of the vertical synchronizing pulse vibrates back and forth of the horizontal synchronizing pulse. Operation under this state takes the following form. That is, as shown in FIG. 11(a), in the case where, for example, the fall of the vertical synchronizing pulse is within the zero address, that is, when the enabling signal is "L" active one and the reference signal is "L" non-active one, there is a fall of the vertical synchronizing pulse, the vertical-position detection and holding circuit 50 latches the reference signal "L", and transmits the same to the horizontal/dummy switching circuit 6. By doing so, the horizontal/dummy switching circuit 6 outputs a dummy pulse, and simultaneously with the outputting of the dummy pulse it is switched over to the condition for outputting the horizontal synchronizing pulses. Accordingly, the horizontal/dummy switching circuit 6 outputs the dummy pulse only immediately following the fall of the vertical synchronizing pulse and, thereafter, outputs the horizontal synchronizing pulses.

By these sequential operations, the output of the horizontal-synchronizing-pulse measuring circuit 7 is brought to $Q_1$, $Q_2$ (which are repesentative of the outputs including $Q_1$, $Q_2$, ..., $Q_n$).

Figure 11B:
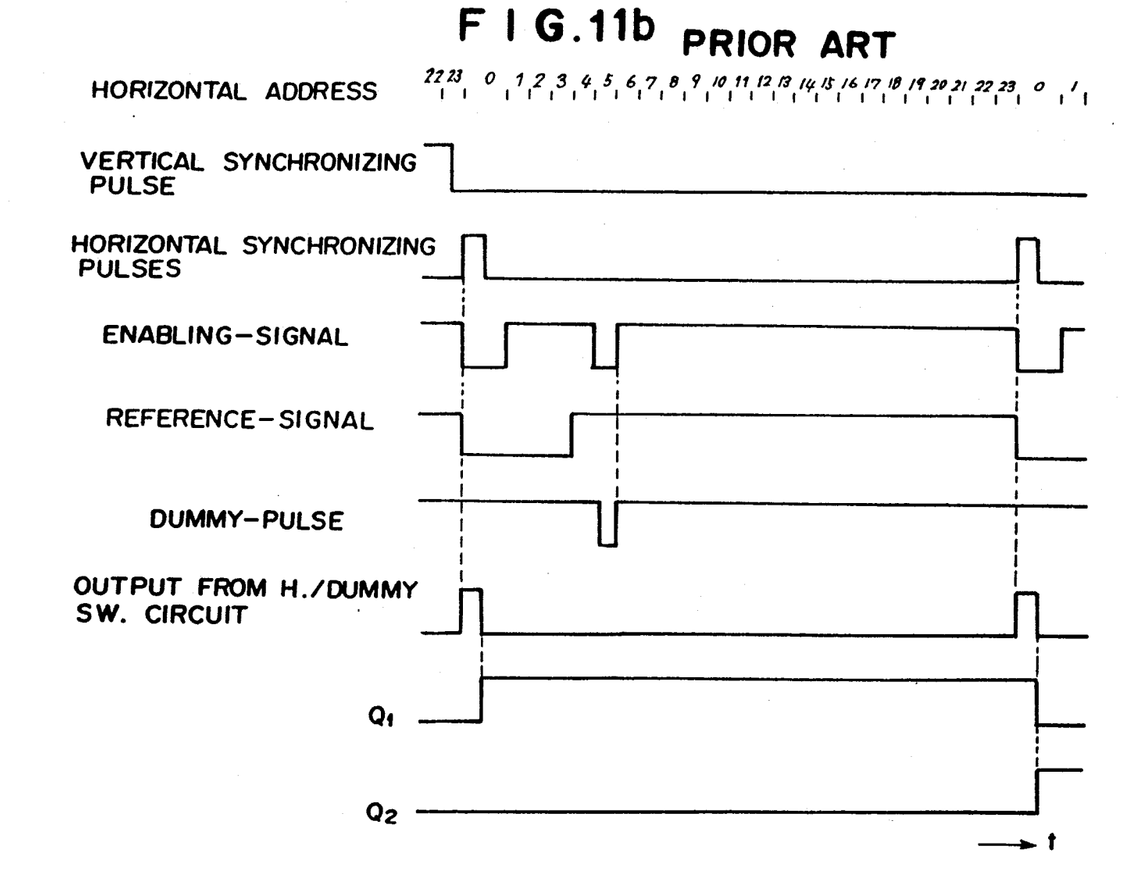

Furthermore, as shown in FIG. 11 (b), in the case where, for example, the fall of the vertical synchronizing pulse is within the twenty-third (23) address, the enabling signal turns to "H" non-active one. Accordingly, the vertical-position detection and holding circuit 50 holds the previous state, and transmits the same to the horizontal/dummy switching circuit 6, without newly latching the reference signal. Thus, when the horizontal synchronizing pulse is outputted immediately after the fall of the previous vertical synchronizing pulse, the horizontal synchronizing pulses are outputted as shown in FIG. 11(b), and the output of the horizontal-synchronizing-pulse measuring circuit 7 is brought to $Q_1$ and $Q_2$. If the dummy pulse has been outputted immediately after the fall of the previous vertical synchronizing pulse, the dummy pulse is outputted in this case.

The above-described horizontal-synchronizing-pulse measuring circuit, which compensates for minute vibrations caused by weak electric field, can produce sufficient advantages by suitable selection of the enabling signal and the reference signal, if the horizontal synchronizing pulses have respectively an interlace and a fixed relationship as in a TV broadcasting signal. In the case of a signal in which the fall positions of the vertical synchronizing pulse at the first field and the second field are not fixed as in a reproducing signal of a VTR (video tape recorder), however, there is a fear of the development of the forms as shown in FIGS. 12(a) and 12(b).

Figure 12A:
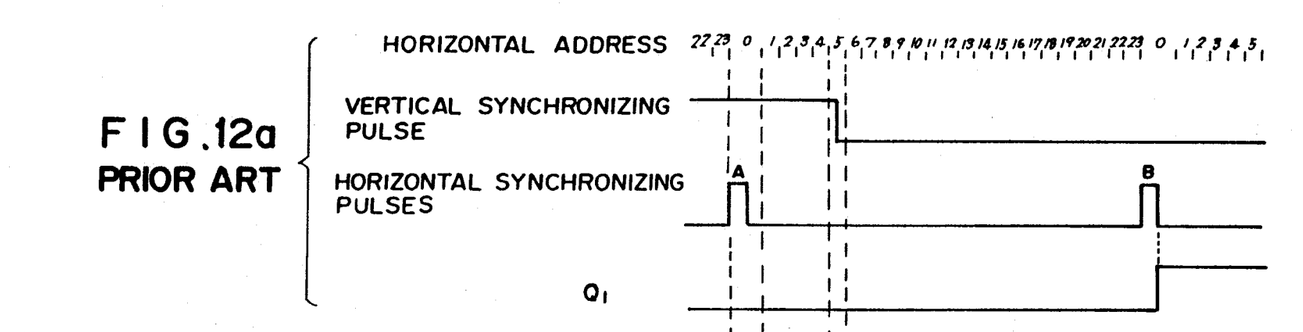
FIGS. 12(a) through (c) are timing charts for an explanation of the operation of the circuit illustrated in FIG. 10.

In the case where FIG. 12(a) is at the first field and the vertical synchronizing pulse falls at the fifth address, the horizontal synchronizing pulse B becomes the clock for the measuring circuit 7 as it is, so that the output of $Q_1$ changes or varies.

Figure 12B:
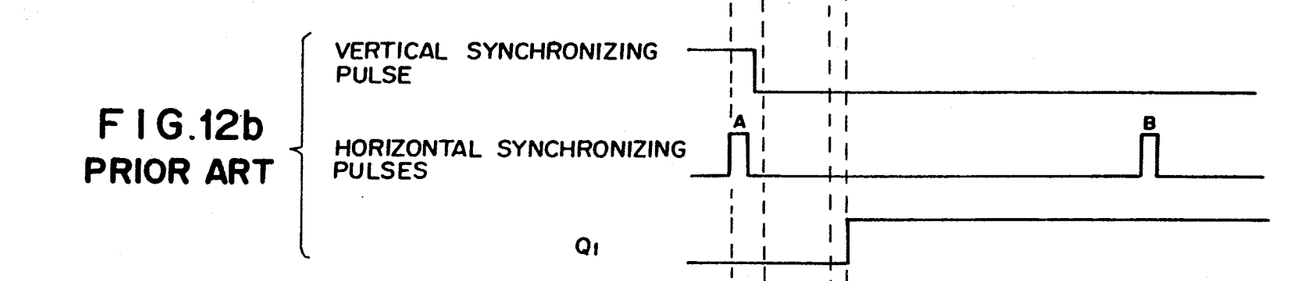

In the case where FIG. 12(b) is at the second field and the vertical synchronizing pulse falls at the zero address, the horizontal synchronizing pulse A serves as the dummy pulse and is inputted as the clock for the measuring circuit 7, so that the output of $Q_1$ changes. When the circuit operates under this state, the outputting of the horizontal synchronizing pulses and the outputting of the dummy pulse are repeated alternately.

Figure 12C:
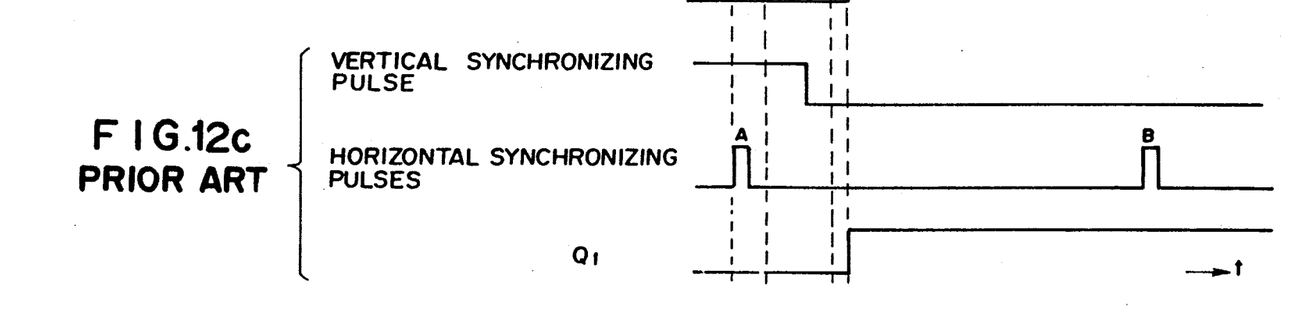

When the first field turns to the relationship illustrated in FIG. 12(c) by the minute vibration under this state, the output becomes a dummy pulse output, because the outputting state of the previous field is being held, so that the horizontal synchronizing pulse A becomes the first clock for the measuring circuit 7. In this manner, the conventional circuit has such disadvantage that the relationship as illustrated in FIG. 12(c) occasionally takes place therein by the minute vibration and this causes the vertical vibrations to appear on the CRT, which makes it extremely difficult to observe the image on the CRT.

Now the preferred embodiments of the present invention are hereinafter explained.

Figure 1:
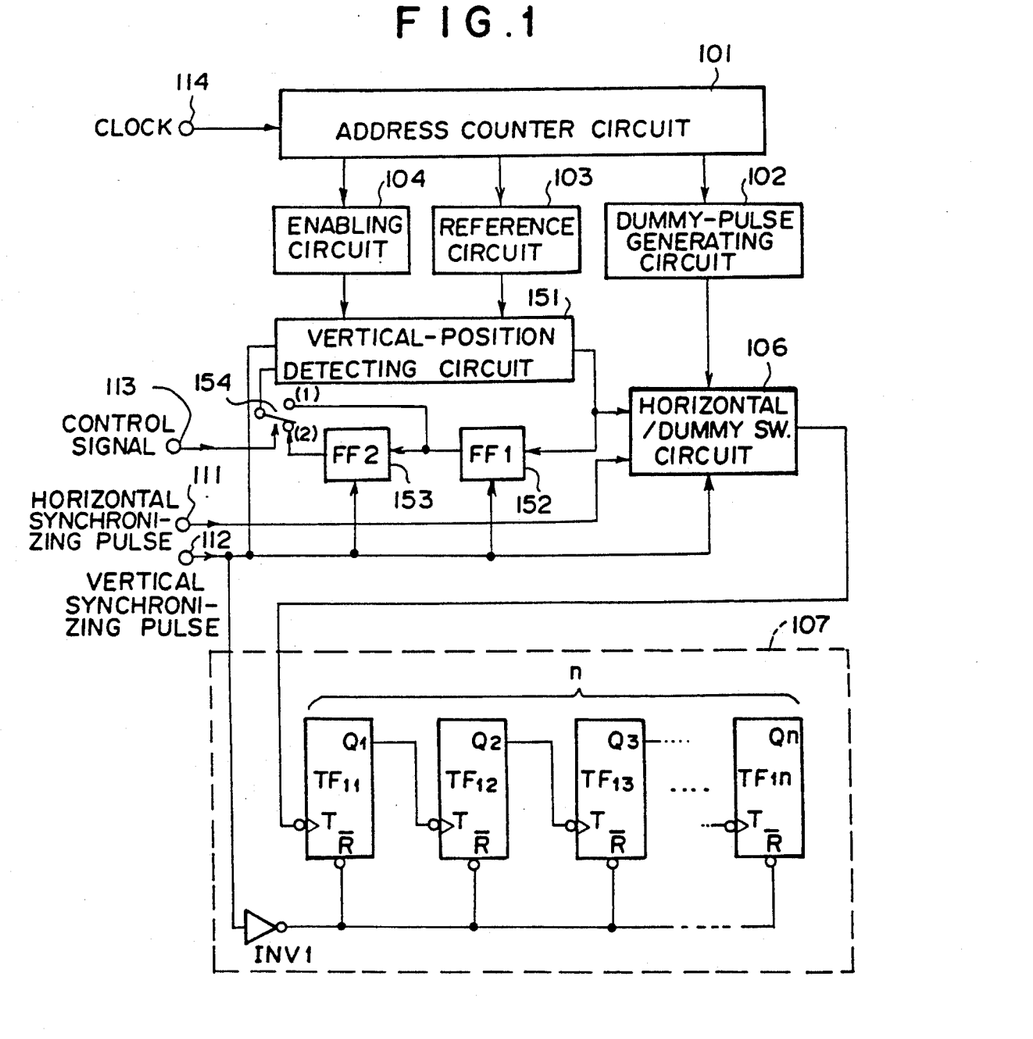
FIG. 1 is a block diagram showing a horizontal-synchronizing-pulse measuring circuit according to a first embodiment of the invention.

Referring first to FIG. 1, there is shown, in a block diagram, a horizontal-synchronizing-pulse measuring circuit according to a first embodiment of the invention. In the first embodiment, connected to outputs of an address counter circuit 101, which divides an interval between horizontal synchronizing pulses into twenty-four (24), are three circuits, that is, a dummy-pulse generating circuit 102 for outputting a dummy pulse at the fifth address, a reference-signal generating circuit 103 for outputting an "H" active signal at the fourth address or above, and an enabling-signal generating circuit 104 for outputting an "L" active signal at the zero address and the fifth address. The address counter circuit 101 has its input terminal 114. Further, inputted to a vertical-position detecting circuit 151 are an output from the reference circuit 103, an output from the enabling circuit 104, the vertical synchronizing pulses and an output from a first flip-flop 152 or a second flip-flop 153, which is selected by a changeover switch 154. A switching signal or control signal is inputted to the changeover switch 154 from an input terminal 113. The vertical-position detecting circuit 151 outputs to the first flip-flop 152 and the horizontal/dummy switching circuit 106 the reference signal when the enabling signal is active, while it outputs an output from the selected one of the flip-flops as it is when the enabling signal is non-active, in accordance with the fall timing of the vertical synchronizing pulse. In addition to the output signal from the vertical-position detecting circuit 151, the dummy pulse, the horizontal synchronizing pulses inputted from an input terminal 111, and the vertical synchronizing pulses inputted from an input terminal 112 are also inputted to the horizontal/dummy switching circuit 106. The output from the flip-flop 152 is connected to the flip-flop 153 and to terminal (1) of the changeover switch 154, while the output from the flip-flop 153 is connected to terminal (2) of the changeover switch 154. An output from the changeover switch 154 controlled by the control signal is connected to the input of the vertical-position detecting circuit 151. Clocks for the respective flip-flops 152 and 153 are commonly provided from the vertical synchronizing pulses. The outputs from the horizontal/dummy switching circuit 106 are made clocks for a measuring circuit 107.

Figure 2A:
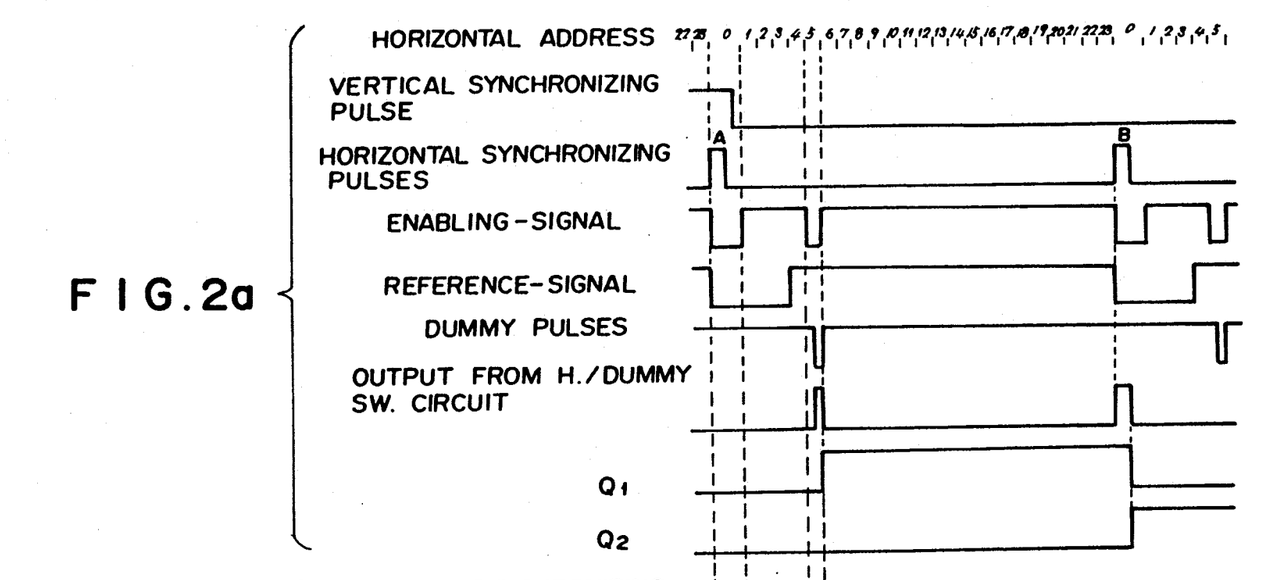
FIGS. 2(a) and 2(b) are timing charts showing operation of the measuring circuit illustrated in FIG. 1.
Figure 2B:
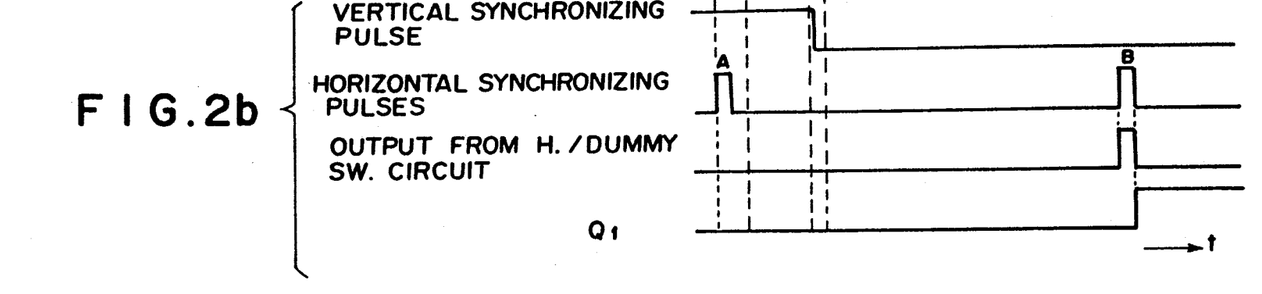

FIGS. 2(a) and 2(b) show time charts of the above-described first embodiment according to the invention.

As shown in FIG. 2(a), in the case where, for example, the fall of the vertical synchronizing pulse is within the zero address, that is, when the enabling signal is "L" active one and the reference signal is "L" non-active one, the vertical-position detecting circuit 151 outputs the reference signal "L" according to the fall timing of the vertical synchronizing pulse, so that the output from the vertical-position detecting circuit 151 is latched in the flip-flop circuit 152 and is transmitted to the horizontal/dummy switching circuit 106. Consequently, the horizontal/dummy switching circuit 106 outputs a dummy pulse and, simultaneously, is switched over to the horizontal-synchronizing-pulse outputting state. Accordingly, the horizontal/dummy switching circuit 106 outputs the dummy pulse only immediately following the fall of the vertical synchronizing pulse and, thereafter, outputs the horizontal synchronizing pulses.

By these sequential operations, the outputs $Q_1, Q_2, \ldots, Q_n$ (as representative thereof, only $Q_1$ and $Q_2$ are indicated in FIG. 2(a)) of the horizontal-syncrhonizing-pulse measuring circuit 107 counts the horizontal synchronizing pulse A as the first clock.

Further, as shown in FIG. 2(b), in the case where, for example, the fall of the vertical synchronizing pulse is within the fifth address, as the reference signal is "H" active one and the enabling signal is "L" active one, the vertical-position detecting circuit 151 outputs the reference signal "H". The "H" signal outputted from the vertical-position detecting circuit 151 is latched in the flip-flop 152 and, also is transmitted to the horizontal/dummy switching circuit 106. The horizontal/dummy switching circuit 106 performs the horizontal-synchronizing-pulse outputting, so that the horizontal-synchronizing-pulse measuring circuit 107 counts the horizontal synchronizing pulse B as the first clock.

Since the flip-flops 152 and 153 take the vertical synchronizing pulses as clocks, a data is shifted to the flip-flop 153 from the flip-flop 152 every one field. Thus, when the changeover switch 154 is on terminal (1), and if the fall of the vertical synchronizing pulse takes place, at the next field, within an address other than the zero address or the fifth address, the same state as the current field continues. For example, if the current outputting state is a dummy-pulse outputting, the output at the next field is also the dummy-pulse outputting. If the changeover switch 154 is on terminal (2), the output from the flip-flop 153 shifted twice causes the same operation as the aforesaid one to take place at the field after next.

Furthermore, the first embodiment will be described, in detail, with reference to FIGS. 3(a) through 3(c) which are waveform views.

Figure 3A:
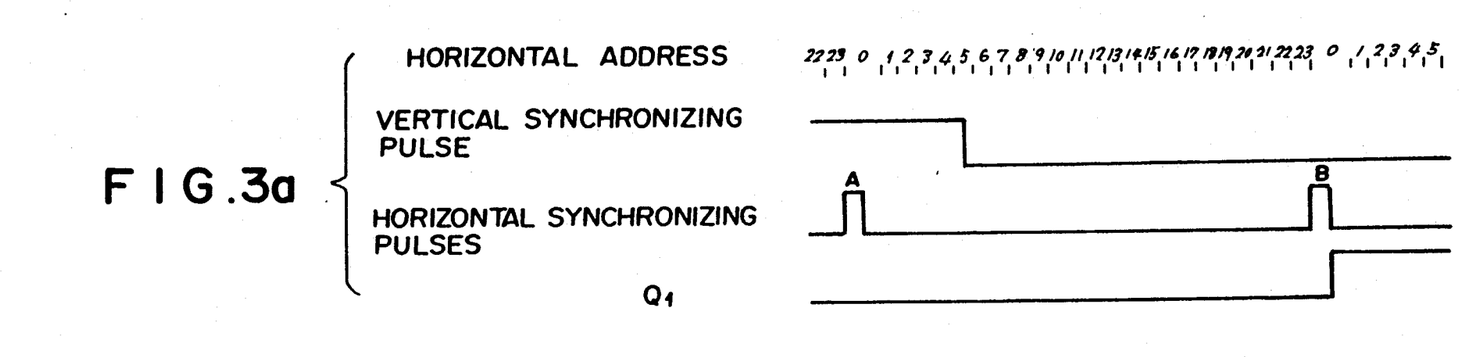
FIGS. 3(a) through 3(c) are timing charts showing the operation of the measuring circuit illustrated in FIG. 1.

First, as shown in FIG. 3(a), in the first field, when the vertical synchronizing pulse falls within the fifth address, the horizontal synchronizing pulse B becomes the first clock for the horizontal-synchronizing-pulse measuring circuit 107. Further, as shown in FIG. 3(b), in the second field, when the vertical synchronizing pulse falls within the zero address, the horizontal synchronizing pulse A becomes the first clock for the measuring circuit 107.

Here, the field is again brought to the first field. As shown in FIG. 3(c), when the fall of the vertical synchronizing pulse falls within the third address due to minute vibration, the operation at second field is effected if the changeover switch 154 is on terminal (1). Thus, the output waveform becomes one $Q_1$ indicated by the broken lines, so that vertical fluctuation occurs on the CRT. If the changeover switch 154 is on terminal (2), however, the operation at the first field is effected.

Accordingly, the output waveform becomes one $Q_1$ as indicated by the solid lines, so that the output is steady.

Figure 3B:
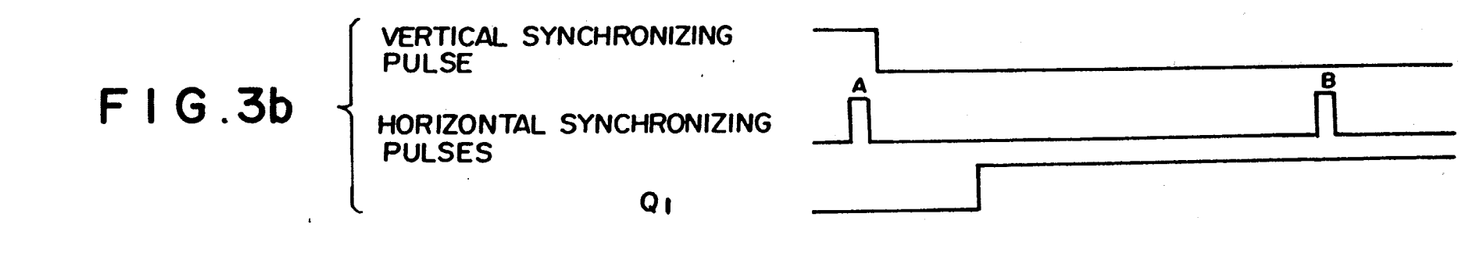
Figure 3C:
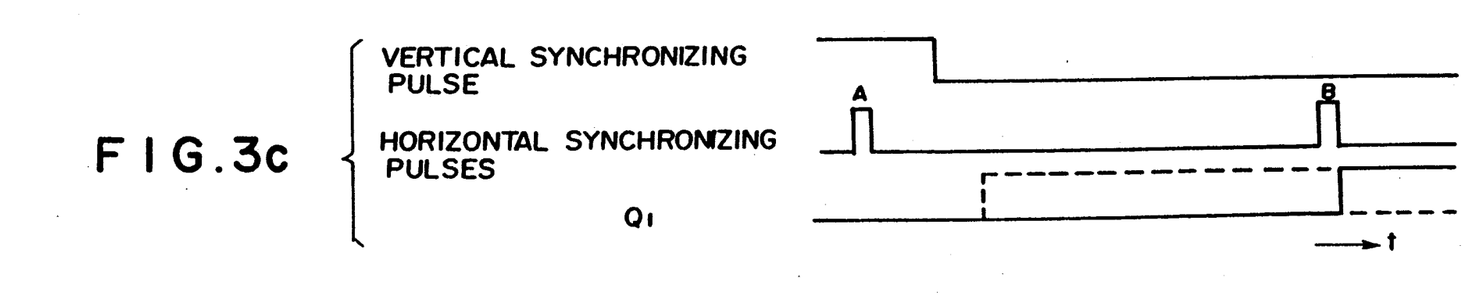

Further, when FIG. 3(b) is the first field and FIG. 3(c) is the second field under the condition that the vertical synchronizing pulses are similar to the non-interlace, the horizontal synchronizing pulse A must be counted as the first clock. In this case, the changeover switch 154 is switched to terminal (1) whereby the output becomes the same as that under the previous field. Thus, the horizontal synchronizing pulse A is inputted to the horizontal-synchronizing-pulse measuring circuit 107 as a steady clock.

Figure 4:
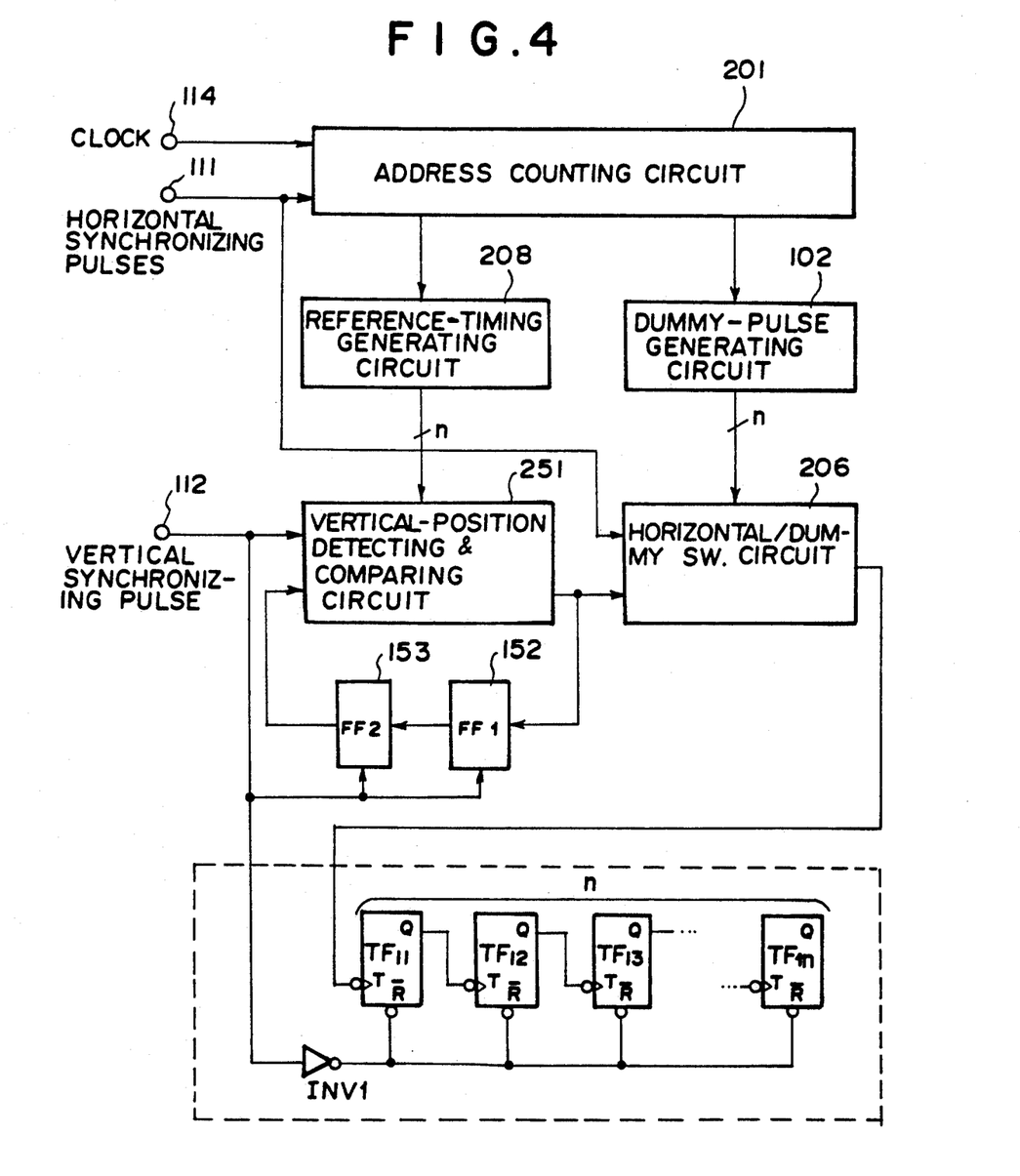
FIG. 4 is a block diagram showing a horizontal-synchronizing-pulse measuring circuit according to a second embodiment of the invention.

Referring next to FIG. 4, there is shown, in a block diagram, a horizontal-synchronizing-pulse measuring circuit according to a second embodiment of the invention. In FIG. 4, components and parts like or similar to those illustrated in FIGS. 1 through 3 are designated by the same reference numerals, and the explanation relating to the like or similar components and parts will therefore be omitted to avoid repetition.

The horizontal-synchronizing-pulse measuring circuit according to the second embodiment of the invention comprises a horizontal counting circuit 201, a reference-timing generating circuit 208, and the dummy-pulse generating circuit 102. That is, the horizontal counting circuit 201 counts the number of m, for example, twenty-four (24) by the horizontal synchronizing pulses from the input terminal 111 and by the clocks from the input terminal 114. An output from the horizontal counting circuit 201 is inputted to the reference-timing generating circuit 208. The reference-timing generating circuit 208 divides twenty-four (24) counts into n, for example, into three, and outputs n signals, that is, three signals which make the respective ranges divided by n active. The dummy-pulse generating circuit 102 divides twenty-four (24) counts into n, that is, into three, and outputs n signals, that is, three signals which make a few counts, for example, one count after the commencement of the respective ranges divided by n active. The output from the reference-timing generating circuit 208, and the vertical synchronizing pulses from the input terminal 112 are inputted to a vertical-position detecting and comparing circuit 251. If a single output of the three outputs from the reference-timing generating circuit 208 which is made active at the position where the vertical synchronizing pulse falls is in agreement with the output from the flip-flop 153, the vertical-position detecting and comparing circuit 251 outputs the output from the flip-flop 153 as it is. If the single output of the three outputs from the reference-timing generating circuit 208 which is made active at the position where the vertical synchronizing pulse falls is in disagreement with the output from the flip-flop 153. one of the outputs from the reference-timing generating circuit 208, which becomes active, is outputted. The output from the vertical-position detecting and comparing circuit 251, the output from the dummy-pulse generating circuit 102 and the horizontal synchronizing pulses are inputted to the horizontal/dummy switching circuit 206. One of the n outputs, for example, of the three outputs from the dummy-pulse generating circuit 102 is selected by the output from the vertical-position detecting and comparing circuit 251, and is outputted from the horizontal/dummy switching circuit 206. Simultaneously, the horizontal/dummy switching circuit 206 is switched such that the horizontal synchronizing pulses are subsequently outputted. The output from the vertical-position detecting and comprising circuit 251 is shifted twice in the first and second flip-flops 152 and 153 in accordance with the falls of the vertical synchronizing pulses and is again inputted to the vertical-position detecting and comprising circuit 251.

Figure 5:
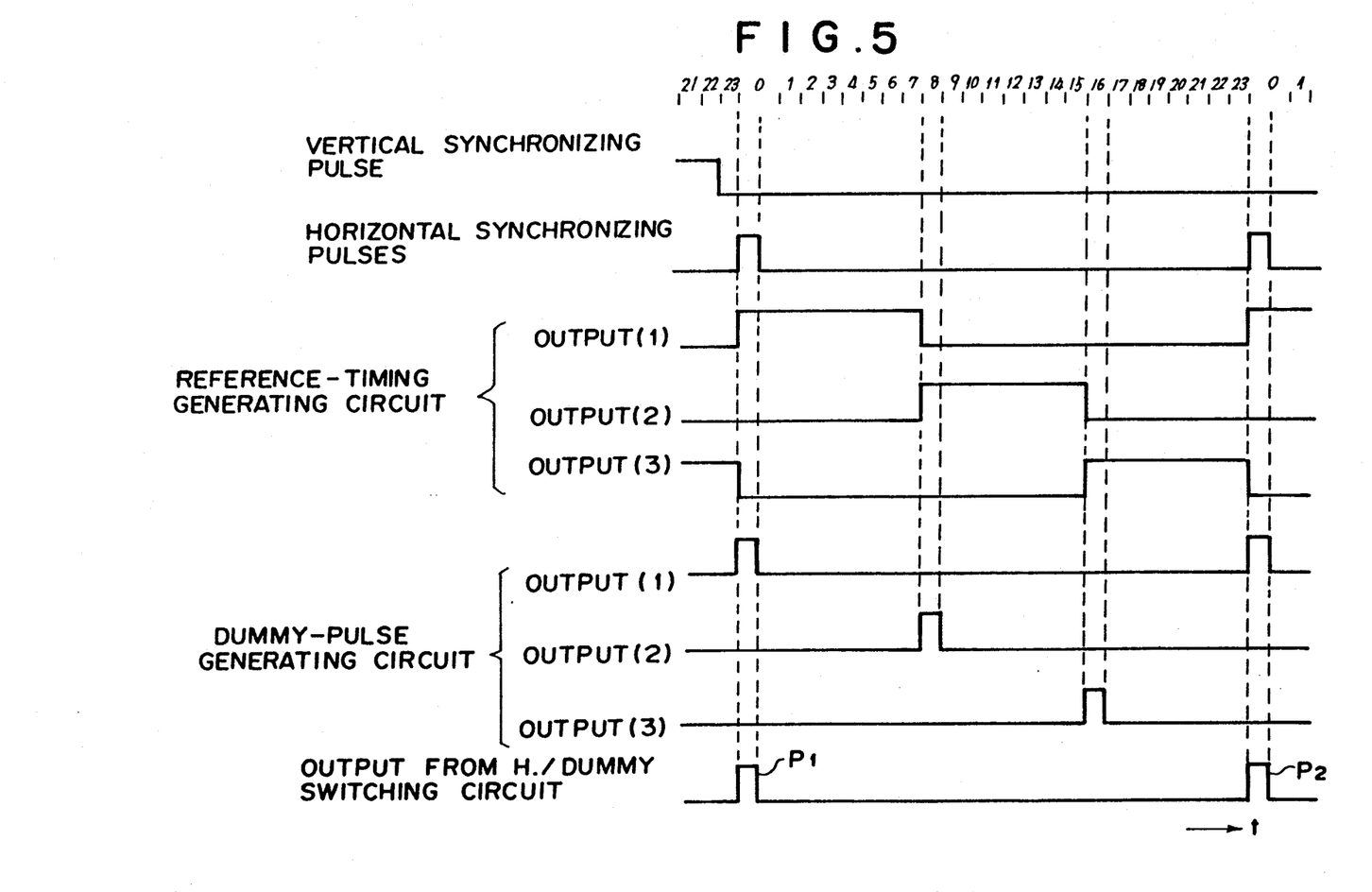
FIG. 5 is a timing chart showing operation of the measuring circuit illustrated in FIG. 4.

The operation of the horizontal-synchronizing-pulse measuring circuit according to the second embodiment of the invention will next be described with reference to FIG. 5 which is a timing chart. The output from the reference-timing generating circuit 208, into which the output from the horizontal counting circuit 201 for counting twenty-four (24), for example, is inputted, is divided into three, so that there are produced three timing outputs (1), (2) and (3). Further, the output from the horizontal counting circuit 201 is inputted to the dummy-pulse generating circuit 102, so that there are produced three pulse outputs (1), (2) and (3). In this connection, since the pulse output (1) is the same in position as the active one of the horizontal synchronizing pulse, the pulse output (1) becomes the active width of the horizontal synchronizing pulse. The vertical-position detecting and comparing circuit 251 selects one output, from the reference-timing generating circuit 208, which becomes active at the fall timing of the vertical synchronizing pulse. The output from the reference-timing generating circuit 208 is compared with the output from the second flip-flop or latch 153. If the comparison indicates agreements, the output from the flip-flop 153 is outputted as it is, while, if the comparison indicates disagreement, the output from the reference-timing generating circuit 208 is outputted.

The output from the vertical-position detecting and comparing circuit 251 is inputted to the horizontal/dummy switching circuit 206. An output corresponding to the position of the output from the vertical-position detecting and comparing circuit 251 is selected from among the outputs (1), (2) and (3) from the dummy-pulse generating circuit 102, and is used as the output from the horizontal/dummy switching circuit 206. Subsequently, switching is made to output the horizontal synchronizing pulses. In this connection, the first pulse $P_1$ in FIG. 5 is a dummy pulse, while the second pulse $P_2$ is the horizontal synchronizing pulse.

Figure 6A:
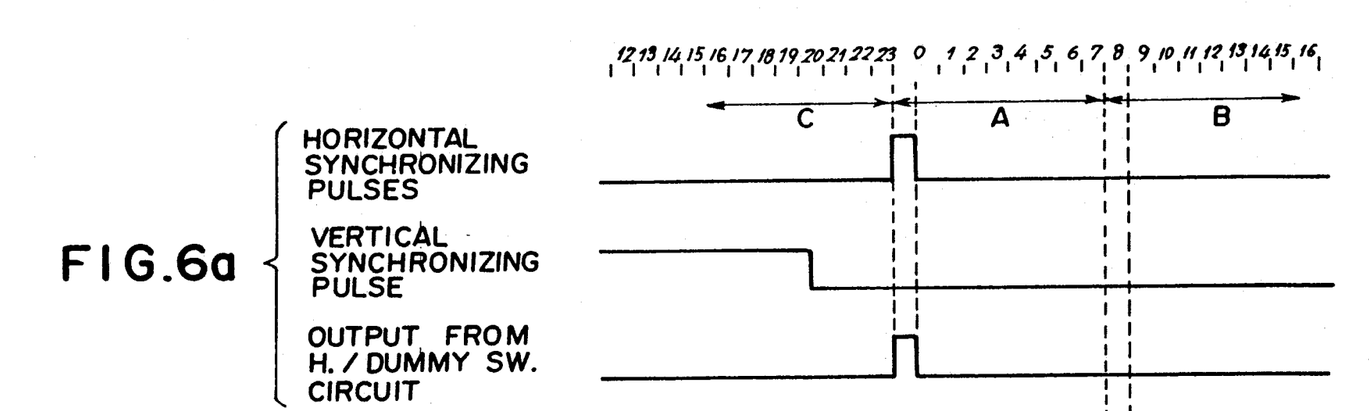
FIGS. 6(a) through 6(c) are timing charts showing the operation of the measuring circuit illustrated in FIG. 4.

Operation at fluctuation of the vertical synchronizing pulse with respect to the horizontal synchronizing pulses will specifically be described with reference to FIGS. 6(a) through 6(c).

It is assumed that, in the case where the position of the vertical synchronizing pulse is within the range of C of the vertical synchronizing pulse at the condition (a), the output from the horizontal/dummy switching circuit 206 is in agreement with the horizontal synchronizing pulse.

Figure 6B:
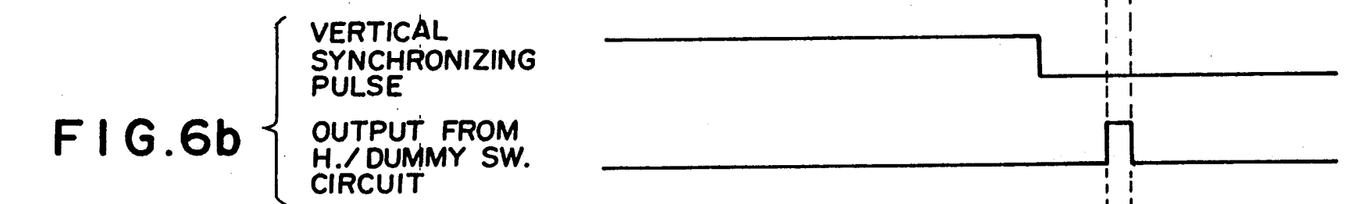

Under the condition illustrated in FIG. 6(b), comparison is made such that the dummy pulse is outputted which is in the range of B in which the output from the horizontal/dummy switching circuit 206 is in disagreement with the horizontal synchronizing pulse within the vertical-position detecting and comprising circuit 251 when the position of the second vertical synchronizing pulse from the condition (a) has moved to the ranged of A. The result of the comparison is outputted. The output is inputted to the horizontal/dummy circuit 206 and outputs the dummy pulse which is within the range of B. Simultaneously with the outputting of the dummy pulse, the output position of the dummy pulse is stored in the first flip-flop 152.

Figure 6C:
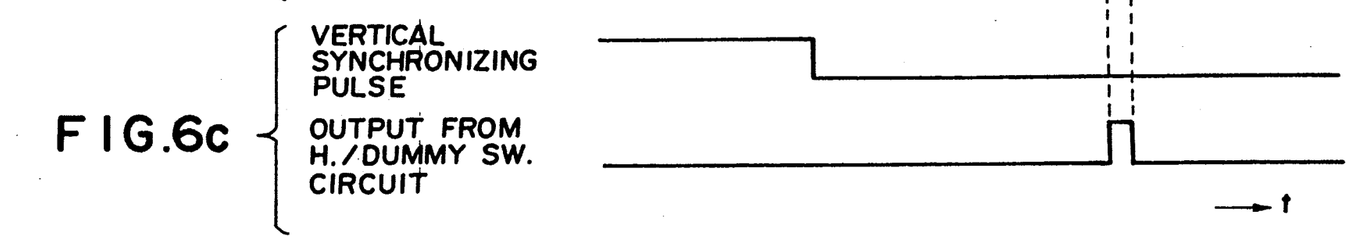

When, as shown in FIG. 6(c), the position of the second vertical synchronizing pulse from the condition (b) is returned to the range of C, there occurs again a disagreement of the signals in the vertical-position detecting and comparing circuit 251. Judging from the output of the flip-flop 152 and 153, however, since the position before the last position is within the range of A, there is such a possibility that the next range becomes the range of A. Inputting is made into the horizontal/dummy switching circuit 206 such tht the dummy pulse within the range of B is outputted. In this connection, leaving of the data before the last data at the flip-flops 152 and 153 is to detect the odd-number field and the even-number field of the TV signal independently of each other.

While the invention has been described in its preferred embodiments, it is to be understood that the words which have been used are words of description rather than limitation and that changes within the purview of the apppended claims may be made without departing from the true scope and spirit of the invention in its broader aspects.

What is claimed is:

1. A horizontal-synchronizing-pulse measuring circuit which is reset by a vertical synchronizing pulse to measure the number of a plurality of horizontal synchronizing pulses, said horizontal-synchronizing-pulse measuring circuit comprising:
    a horizontal address counter;
    a dummy-pulse generating circuit for generating a dummy pulse, a reference-signal generating circuit for generating a reference signal, an enabling signal generating circuit for generating an enabling signal, each of which being connected to said horizontal address counter;
    a vertical-position detecting circuit for outputting said reference signal when said enabling signal is active and a holding signal when said enabling signal is non-active;
    a horizontal/dummy switching circuit for effecting switching such that said dummy pulse is outputted only once following said vertical synchronizing pulse at the time when an output from said vertical-position detecting circuit is non-active and said horizontal synchronizing pulses are outputted at other times;
    a first-flip flop receiving a signal input from said vertical-position detecting circuit and a clock input of said vertical synchronizing pulse;
    a second flip-flop receiving a signal input from said first flip-flop and a clock input of said vertical synchronizing pulse;
    a changeover switch which effects switching between the output from said first flip-flop and an output from said second flip-flop to output a signal as said holding signal; and
    a measuring circuit for measuring output pulses from said horizontal/dummy switching circuit.

2. A horizontal-synchronizing-pulse measuring circuit according to claim 1, in which said changeover switch has its output connected to an input of said vertical-position detecting circuit, said first flip-flop and said second flip-flop having their clocks connected to said horizontal synchronizing pulses and said horizontal/dummy switching circuit making its output a clock signal of said measuring circuit.

3. A horizontal-synchronizing-pulse measuring circuit according to claim 1, in which said changeover switch is controlled by a control signal for switching operation.

4. A horizontal-synchronizing-pulse measuring circuit which is reset by a vertical synchronizing pulse to measure the number of a plurality of horizontal synchronizing pulses, said horizontal synchronizing-pulse measuring circuit comprising:
    a horizontal address counter for dividing a pulse interval between said horizontal synchronizing pulses into a plurality of addresses;
    a dummy-pulse generating circuit for generating a dummy pulse on the basis of a decoded output from said horizontal address counter at a first adddress;
    a reference-signal generating circuit for generating, on the basis of said decoded output from said horizontal address counter, a reference signal which is activated at an address at least equal to or above a second address smaller than said first address;
    an enabling-signal generating circuit for generating an enable signal which is activated at a first range of addresses including said second address and at second range of addresses including said first address, on the basis of said decoded output from said horizontal counter;
    a vertical-position detecting circuit for outputting said reference signal when said enable signal is active and a holding signal when said enable signal is non-active, at the particular timing of said vertical synchronizing pulse;
    a horizontal/dummy swithcing circuit for performing such switching that said dummy pulse is outputted only once subsequent to said vertical synchronizing pulse at the time an output from said vertical-position detecting circuit is activated, and from said horizontal synchronizing pulses are outputted under a state other than that of activations of the output from said vertical-position detecting circuit;
    a first flip-flop having a signal input that is an output from said vetical-position detecting circuit, and having a click input that is said vertical synchronizing pulse;
    a second flip-flop having a signal input that is an output from said first flip-flop, and having a clock input that is said vertical synchronizing pulse;
    a changeover switch for switching the output from said first flip-flop and an output from said second flip-flop by means of a control signal to output a signal as said holding signal; and
    a measuring circuit for measuring output pulses from said horizontal/dummy switching circuit as a clock input.

5. A horizontal-synchronizing-pulse measuring circuit which is reset by a vertical synchronizing pulse to measure the number of a plurality of horizontal synchronizing pulse, said horizontal-synchronizing-pulse measuring circuit comprising:
    a horizontal interval counting circuit which is reset by said horizontal synchronizing pulses to count clock pulse;
    a reference-timing generting circuit for dividing the number of horizontal counts from said horizontal interval counting circuit into a first predetermined number of intervals and generating output signals corresponding to said first predetermined number of intervals;
    a dummy-pulse generating circuit for dividing the number of horizontal counts from said horizontal interval counting circuit into said first number of intervals and generating output signals during each of which a second predetermined number of clock signals are activated;

a vetical-position detecting and comparing circuit for outputting an output in which one of said output signals from said reference-timing generating circuit is in agreement with a holding signal at the particular timing of said vertical synchronizing pulse;

a horizontal/dummy switching circuit for selecting an output signal from said dummy-pulse generating circuit on the basis of the output from said vertical-position detecting and comparing circuit to bring the output from said dummy-pulse generating circuit into an output, wherein said horizontal/-dummy switching circuit switches to and outputs said horizontal synchronizing pulses when the outputting from said dummy-pulse generating circuit has been completed;

a first flip-flop having a data input into which the output from said vertical-position detecting and comparing circuit is inputted, and having a clock input into which said vertical synchronizing pulse is inputted;

a second flip-flop having a data input into which the output from said first flip-flop is inputted, and having a clock input into which said vertical synchronizing pulse is inputted, to output said holding signal; and a measuring circuit for measuring output pulses from said horizontal/dummy switching circuit as a clock input.

* * * * *